United States Patent
Appala et al.

(10) Patent No.: US 10,958,622 B2
(45) Date of Patent: Mar. 23, 2021

(54) HIERARCHICAL SECURITY GROUP IDENTIFIERS

(71) Applicant: Cisco Technology, Inc., San Jose, CA (US)

(72) Inventors: Syam Sundar V Appala, Santa Clara, CA (US); Kiran Kumar Yedavalli, San Jose, CA (US); Shyamsundar Nandkishor Maniyar, San Jose, CA (US); Sanjay Kumar Hooda, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 200 days.

(21) Appl. No.: 15/867,124

(22) Filed: Jan. 10, 2018

(65) Prior Publication Data

US 2019/0215303 A1 Jul. 11, 2019

(51) Int. Cl.
*H04L 29/06* (2006.01)
*H04L 12/46* (2006.01)

(52) U.S. Cl.
CPC .......... *H04L 63/0236* (2013.01); *H04L 12/46* (2013.01); *H04L 63/104* (2013.01); *H04L 63/20* (2013.01)

(58) Field of Classification Search
CPC .... H04L 63/0236; H04L 63/104; H04L 63/20
See application file for complete search history.

(56) References Cited

U.S. PATENT DOCUMENTS

| 7,530,112 | B2 | 5/2009 | Smith |
| 7,840,708 | B2 | 11/2010 | Smith et al. |
| 2004/0160903 | A1 | 8/2004 | Gai et al. |
| 2006/0140201 | A1* | 6/2006 | Kumar .................... H04L 47/15 370/412 |
| 2008/0056275 | A1* | 3/2008 | Smiljanic ................ H04L 47/15 370/395.41 |
| 2010/0071024 | A1* | 3/2010 | Eyada .................. H04L 63/0263 726/1 |
| 2010/0153706 | A1* | 6/2010 | Haddad ............... H04L 63/0407 713/153 |
| 2012/0023546 | A1* | 1/2012 | Kartha .................. H04L 63/104 726/1 |
| 2013/0336331 | A1* | 12/2013 | Woerndle ............ H04L 12/4641 370/409 |
| 2017/0041230 | A1* | 2/2017 | Huang .................. H04L 45/745 |

(Continued)

OTHER PUBLICATIONS

Li et al., "Security Policy Violations in SDN Data Plane," IEEE/ACM Transactions on Networking Year: 2018 | vol. 26, Issue: 4 | Journal Article.*

(Continued)

*Primary Examiner* — Roderick Tolentino
(74) *Attorney, Agent, or Firm* — Edell, Shapiro & Finnan, LLC

(57) ABSTRACT

In one example, a network element in a first network receives a network packet including a first security group identifier. The network element identifies the first security group identifier, determines that the first security group identifier is hierarchically correlated with a second security group identifier, and inserts the second security group identifier into the network packet. The network element forwards the network packet including the second security group identifier.

20 Claims, 5 Drawing Sheets

(56) References Cited

U.S. PATENT DOCUMENTS

2017/0126740 A1* 5/2017 Bejarano Ardila ..... H04L 63/20
2018/0027021 A1* 1/2018 Tan .................... H04L 41/0893
                                                    726/1
2018/0083873 A1* 3/2018 Seino ................. H04L 12/4641
2018/0103011 A1* 4/2018 Li ........................ H04L 43/062

OTHER PUBLICATIONS

Thant et al. "Development of Firewall Optimization Model Using by Packet Filter," 2016 UKSim-AMSS 18th International Conference on Computer Modelling and Simulation (UKSim) Year: 2016 | Conference Paper.*

"Security Groups for Your VPC", Amazon Web Services, Inc., http://docs.aws.amazon.com/AmazonVPC/latest/UserGuide/VPC_SecurityGroups.html, downloaded from the Internet Dec. 7, 2017, 13 pgs.

VMware, Inc., "Vmware NSX With Check Point VSEC", Enhancing Micro-Segmentation Security, Oct. 2017, 25 pages.

Nuage Networks, "Securing cloud environments with Nuage Networks VSP: Policy-based security automation and microsegmentation overview", Strategic White Paper, PR1512017026EN, 2016, 11 pages.

* cited by examiner

HIERARCHICAL SECURITY GROUP IDENTIFIERS

TECHNICAL FIELD

The present disclosure relates to computer network security.

BACKGROUND

A security group may be a logical collection/grouping of network devices. A security group identifier may be an identifier (e.g., tag, mark, etc.) on a network packet, and may be used to enforce a security (e.g., access) policy in the network. A network packet may be assigned a security group identifier based on the particular security group/network device that sent the network packet.

DESCRIPTION OF EXAMPLE EMBODIMENTS

Overview

In one example, a network element in a first network receives a network packet including a first security group identifier. The network element identifies the first security group identifier, determines that the first security group identifier is hierarchically correlated with a second security group identifier, and inserts the second security group identifier into the network packet. The network element forwards the network packet including the second security group identifier.

EXAMPLE EMBODIMENTS

Many users/enterprises are shifting from Virtual Local Area Networks (VLANs) to Software Defined Access (SDA) networks. SDA networks may utilize a particular type of security group identifier referred to as a Security Group Tag/Scalable Group Tag (SGT). Certain issues can arise in the enforcement of network security policies in SDA networks. For example, such issues may arise when a first group of devices exhibits community behavior (i.e., the devices in the first group are permitted to communicate with each other), while a second group of devices exhibits isolated behavior (i.e., the devices in the second group are prohibited from communicating with each other) within a network fabric, but communications from both groups are governed by the same policy upon exiting the network fabric.

Conventionally, these types of policies are enforced by creating new SGTs that are treated separately/independently from the other SGTs. However, such conventional techniques can lead to many undesirable issues, including lack of scalability and functionality. Conventional techniques are not scalable because they can lead to a "tag explosion" in which the number of SGTs becomes unmanageable. Conventional techniques also fail to provide maximal functionality because SGTs cannot be defined with fine granularity for various endpoints. These issues can lead to policy management overhead and gaps, and require explicit state management by the managing applications (e.g., Security Information and Event Management (SEIM), Vulnerability Assessment (VA), etc.).

As such, techniques are presented herein for hierarchical security group identifiers to overcome the issues of conventional techniques. Unlike the conventional "flat" SGT arrangements described above, the techniques described herein provide both scalability and functionality using a hierarchical security group arrangement.

Figure 1A:
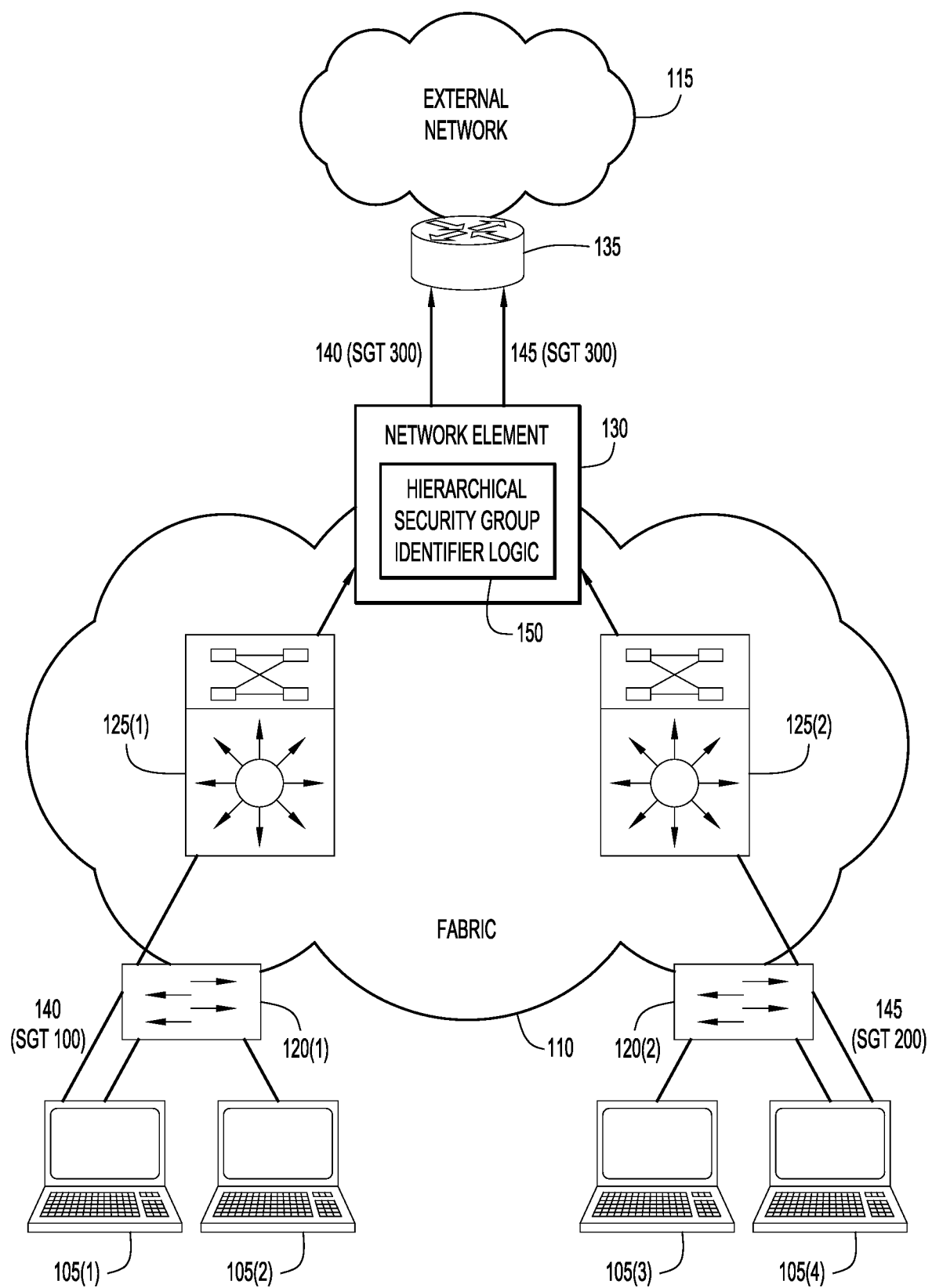
FIG. 1A is a block diagram of a system configured to utilize hierarchical security group identifiers, according to an example embodiment.

FIG. 1A is an overview diagram of a system configured to utilize hierarchical security group identifiers. The system includes client devices 105(1)-105(4), network fabric 110, and external network 115. The network fabric 110 includes fabric edge switches 120(1) and 120(2), fabric intermediate routers 125(1) and 125(2), and network element 130. The external network 115 includes router 135. Fabric edge switches 120(1) and 120(2) may be first hop switches capable of performing encapsulation/decapsulation, fabric intermediate routers 125(1) and 125(2) may be pure intermediate Layer 3 (L3) forwarders, and network element 130 may be a fabric border route switch processor serving as an exchange point with devices/networks outside fabric 110. The network fabric 110 may appear as a single switch/router to external network 115. An Access Point (AP) may encapsulate to network element 130 or to fabric edge switches 120(1) or 120(2) as directed by a controller. Client devices 105(1)-105(4) may be connected to one or more APs.

In this example, client devices 105(1) and 105(2) are in a first group that communicates with fabric edge switch 120(1), and client devices 105(3) and 105(4) are in a second group that communicates with fabric edge switch 120(2). The fabric control plane may maintain a host tracking database to track this information, as shown in Table 1 below.

TABLE 1

| Key | Behind |
|---|---|
| Client Device 105(1) | Fabric Edge Switch 120(1) |
| Client Device 105(2) | Fabric Edge Switch 120(1) |
| Client Device 105(3) | Fabric Edge Switch 120(2) |
| Client Device 105(4) | Fabric Edge Switch 120(2) |

In this example, client devices 105(1) and 105(2) are isolated client devices, meaning that client devices 105(1) and 105(2) are prohibited from communicating with each other. To enforce this policy, communications sent from client devices 105(1) and 105(2) include an isolated SGT (SGT 100). For example, if client device 105(1) sends fabric edge switch 120(1) a network packet destined for client device 105(2), the fabric edge switch 120(1) may determine that the network packet includes SGT 100 and decline to forward the network packet to client device 105(2). An example policy for SGT 100 is provided as follows.

Switch(config)# ip access role isolated_traffic
Switch(config-rb-acl)#100 deny ip
Switch(config-rb-acl)# exit Switch(config)# cts role-based permissions from 100 to 100 isolated_traffic Meanwhile, client devices 105(3) and 105(4) are community client devices, meaning that client devices 105(3) and 105(4) are permitted to communicate with each other. As such, communications sent from client devices 105(3) and 105(4) include a community SGT (SGT 200). For example, if client device 105(3) sends to fabric edge switch 120(2) a network packet destined for client device 105(4), the fabric edge switch 120(2) may determine that the network packet includes SGT 200 and forward the network packet to client device 105(2). In one example, no policy is needed for communications between community devices because such communication is permitted by default.

As shown in FIG. 1A, client device 105(1) transmits a network packet 140 that is destined for external network 115. The network packet 140 includes SGT 100, and travels from client device 105(1) to network element 130 via fabric edge switch 120(1) and fabric intermediate router 125(1). Similarly, client device 105(4) transmits a network packet 145 that is also destined for external network 115. The network packet 145 includes SGT 200, and travels from client device 105(4) to network element 130 via fabric edge switch 120(2) and fabric intermediate router 125(2).

In this example, the external network 115 applies the same policies to network packets 140, 145 because they both originate from client devices 105(1), 105(4). In other words, external network 115 need not distinguish between network packet 140 and network packet 145. Despite this, conventionally, a new SGT would be inserted into network packet 140, and another new SGT would be inserted into network packet 145. These two new SGTs would have no relation to each other, thereby reducing scalability and functionality. As such, unlike conventional techniques, network element 130 includes hierarchical security group identifier logic 150 to improve scalability and functionality.

Specifically, network element 130 identifies SGT 100 included in network packet 140, determines that SGT 100 is hierarchically correlated with a new SGT (SGT 300), and inserts the SGT 300 into network packet 140 before forwarding network packet 140 (including SGT 300) to external network 115. Similarly, network element 130 identifies SGT 200 included in network packet 145, determines that SGT 200 is also hierarchically correlated with SGT 300, and inserts the SGT 300 into network packet 145 before forwarding network packet 140 (including SGT 300) to external network 115.

There are many ways network element 130 may determine which SGT to insert into the network packets 140, 145. For example, the network element 130 may use SGT Exchange Protocol (SXP) to assign SGT 300 to the network packets 140, 145. More specifically, the network element 130 may receive a mapping of the Internet Protocol (IP) addresses of client devices 105(1)-105(4) to SGT 300 to enable the network element 130 to reclassify network packets 140, 145. SGT information may also be carried in overlay networks (in the overlay header), in non-overlay networks (in a vendor-specific metadata header), or using Platform Exchange Grid (pxGrid). In yet another example, the network element 130 may include a translation table directly relating SGTs 100, 200, and 300, as shown in Table 2.

TABLE 2

| Source SGT | Translated SGT |
|---|---|
| 100 | 300 |
| 200 | 300 |

SGT 100 and SGT 200 may be referred to herein as child (or secondary) SGTs, and SGT 300 may be referred to as a parent (or primary) SGT. SGTs 100 and 200 are used to enforce policies within the network fabric 110 (e.g., for intra-fabric communications), and SGT 300 is used to enforce policies outside the network fabric 110 (e.g., when network packets 140, 145 exit the fabric 110). Despite being used to enforce different policies in the fabric 110 (SGT 100 is an isolated SGT, but SGT 200 is a community SGT), SGTs 100 and 200 both point to SGT 300 so as to cause the network element 130 to include SGT 300 in network packets 140, 145 before forwarding the network packets 140, 145 to external network 115.

Figure 1B:
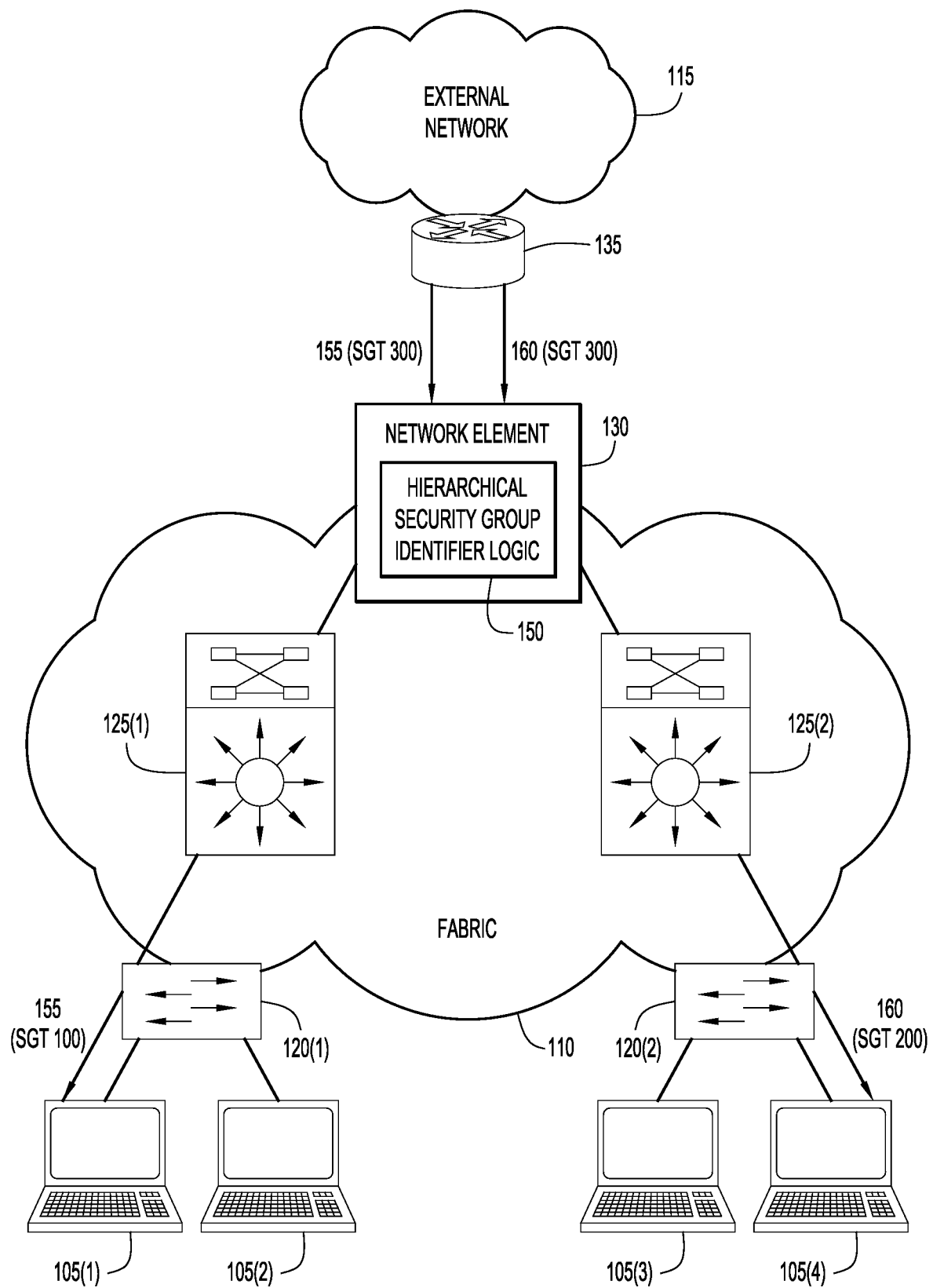
FIG. 1B is a block diagram of the system of FIG. 1A, according to another example embodiment.

FIG. 1B is an overview diagram of the system of FIG. 1A, according to another example embodiment. Whereas FIG. 1A illustrates an example involving outgoing network packets (i.e., network packets exiting the network fabric 110), FIG. 1B illustrates an example involving incoming network packets (i.e., network packets entering the fabric 110).

As shown in FIG. 1B, external network 115 transmits a network packet 155 that is destined for client device 105(1), and a network packet 160 that is destined for client device 105(4). The network packets 155, 160 both include SGT 300, and travel from router 135 to network element 130.

In this example, the external network 115 applied the same policies to network packets 155, 160, and therefore did need not distinguish between network packet 155 and network packet 160. This is why both network packets 155, 160 initially have the same SGT (SGT 300). However, network fabric 110 does need to distinguish between network packet 155 and network packet 160. This is because network packet 155 is destined for client device 105(1), which is an isolated client device, and network packet 155 is destined for client device 105(4), which is a community client device. In other words, the network fabric 110 enforces different security policies on network packets 155, 160 even though network element 130 initially receives both network packets 155, 160 including the same SGT (SGT 300).

In this example, network element 130 identifies SGT 300 included in network packets 155, 160, determines that SGT 300 is hierarchically correlated with SGT 100 and SGT 200, and inserts SGT 100 into network packet 155, and SGT 200 into network packet 160. Network element 130 forwards the network packets 155, 160 to client devices 105(1), 105(4), respectively. The network element 130 determines which child SGT (i.e., SGT 100 or SGT 200) to insert into each network packet 155, 160 by examining destination information (e.g., destination IP address, destination port number, etc.) of the network packets 155, 160. For example, network element 130 may insert SGT 100 into network packet 155 based, at least in part, on a determination that the destination IP address of network packet 155 is associated with client device 105(1). Similarly, network element 130 may insert SGT 200 into network packet 160 based, at least in part, on a determination that the destination IP address of network packet 160 is associated with client device 105(4).

As mentioned, child SGTs 100 and 200 are used to enforce policies within the network fabric 110 (e.g., for intra-fabric communications), and parent SGT 300 is used to enforce policies outside the network fabric 110 (e.g., when network packets 140, 145 exit the fabric 110). Despite being used to enforce different policies in the fabric 110 (SGT 100 is an isolated SGT, but SGT 200 is a community SGT), SGT 300 points to SGT 100 and SGT 200 in the network element 130 so as to cause the network element 130 to include SGT 100 or SGT 200 in network packets 155, 160 before forwarding the network packets 155, 160 to their respective client devices 105(1), 105(4).

Thus, generally, a network element in a first network may receive a network packet including a first security group identifier (e.g., first SGT). The network element may identify the first security group identifier, determine that the first security group identifier is hierarchically correlated with a second security group identifier (e.g., second SGT), and insert the second security group identifier into the network packet. The network element may forward the network packet including the second security group identifier.

As described above, the network packet may be outgoing (e.g., an egress packet with respect to the network fabric 110 as illustrated in FIG. 1A), or incoming (e.g., an ingress packet with respect to the network fabric 110 as illustrated FIG. 1B). If the network packet is outgoing from the network fabric, receiving the network packet may include receiving the network packet from within the first network, where the first security group identifier is a child security group identifier and is associated with a set of security policies that apply to the network packet within the first network. Forwarding the network packet may include forwarding the network packet to a second network, where the second security group identifier is a parent security group identifier of the child security group identifier.

If the network packet is incoming to the network fabric, receiving the network packet includes receiving the network packet from a second network, and forwarding the network packet includes forwarding the network packet to within the first network, where the second security group identifier is a child security group identifier and is associated with a set of security policies that apply to the network packet within the first network, and the first security group identifier is a parent security group identifier of the child security group identifier.

FIGS. 1A-1B illustrate just one example embodiment. Various numbers of client devices, network elements (e.g., switches, routers, etc.), and external networks may be implemented consistent with the techniques described herein. Further, multiple SGTs may be associated with a single client device (e.g., client device 105(1) may also be associated with SGT 101). Moreover, as explained in greater detail below, security group identifiers other than SGTs may be hierarchically arranged in accordance with the techniques presented herein.

Figure 2:
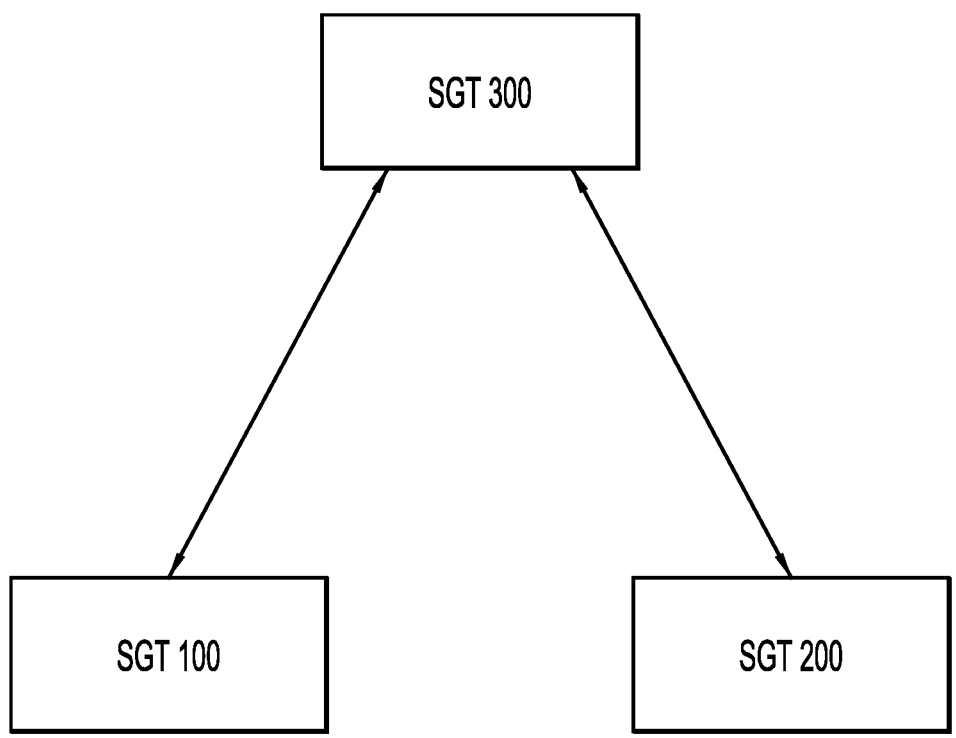
FIG. 2 is a diagram logically illustrating hierarchically arranged security group identifiers, according to an example embodiment.

Turning now to FIG. 2, shown is a diagram logically illustrating hierarchically arranged SGTs. Shown are parent SGT 300 and children SGT 100 and SGT 200. As represented by the double-sided arrows in FIG. 2, the present techniques may also support hierarchical inheritance from a parent SGT to a child SGT, and/or from a child SGT to a parent SGT. More specifically, the parent (child) SGT may be associated with a set of security policies and/or classification criteria inherited from the child (parent) SGT.

Security policy inheritance may occur, for example, when a network administrator is initially configuring device groups/SGTs and corresponding security policies. Defining a hierarchy/categorization/nest of SGTs may enable efficient enforcement of various security policies. Thus, for example, a child SGT may inherit the security policies of a parent SGT, leading to fine-tuned/differentiated classification and policy enforcement.

With continued reference to FIG. 2, in one example of child-to-parent security policy inheritance, parent SGT 300 may inherit the "isolation" security policy of SGT 100, which applies to communications sent from/destined for devices 105(1)-105(2). This ensures, for example, that even traffic entering fabric 110 from external network 115 cannot circumvent the original intent of the user. For instance, if a network packet originates from client device 105(1), exits fabric 110 for external network 115, and then re-enters the network fabric 110 from external network 115, that network packet may not be transmitted to client device 105(2). This is because the original network packet was classified as originating from 105(1) and a corresponding SGT tag was applied to this packet. As mentioned, parent-to-child security policy inheritance may also be supported.

In one example, the default rule is that a first SGT inherits all or none of the security policies of a second SGT. However, there may be other rules in which an SGT inherits a subset of security policies from another SGT. For instance, such inheritance may be allowed if certain criteria are met. In one example, for a parent SGT with three distinct security policies, a first child SGT may inherit one security policy, a second child SGT may inherit two security policies, and a third child SGT may inherit all three security policies. Thus, by providing such granular control, the network administrator may choose a subset of attributes/policies to be inherited. This enables finer flexibility and control over policy inheritance.

In another example, a first SGT may inherit a set of security policies that applied to a parent SGT and/or child SGT of the second SGT. Thus, hierarchical group structures may be inherited. For example, an SGT that inherits a set of security policies of an SGT having subgroups may be aware of the subgroup policy, and therefore may enforce those inherited policies. For instance, if the network administrator creates SGT 400 (not shown) as a parent of SGT 300, SGT 400 may inherit the security policies not only of SGT 300, but also of SGTs 100 and 200.

As mentioned, SGTs may also inherit classification criteria (e.g., user, user group, device type, location, threat, risk, etc.) from other SGTs. Classification criteria may be used to determine which security policies apply to a given network packet. With continued reference to FIG. 2, in one example of parent-to-child classification criteria inheritance, when a network administrator is defining child SGT 100, the network administrator may choose to retain parent SGT 300 classification criteria in the child SGT 100, and/or extend the classification criteria with additional static (e.g., a specific user, device identifiers (instead of group constructs such as an Active Directory (AD) group), etc.) or dynamic (e.g., risk score, threat score, etc.) criteria in the child SGT 100. Child-to-parent classification criteria inheritance may also be supported. Classification criteria may be inherited in a similar manner as security policies (e.g., a subset of classification criteria may be inherited).

Figure 3:
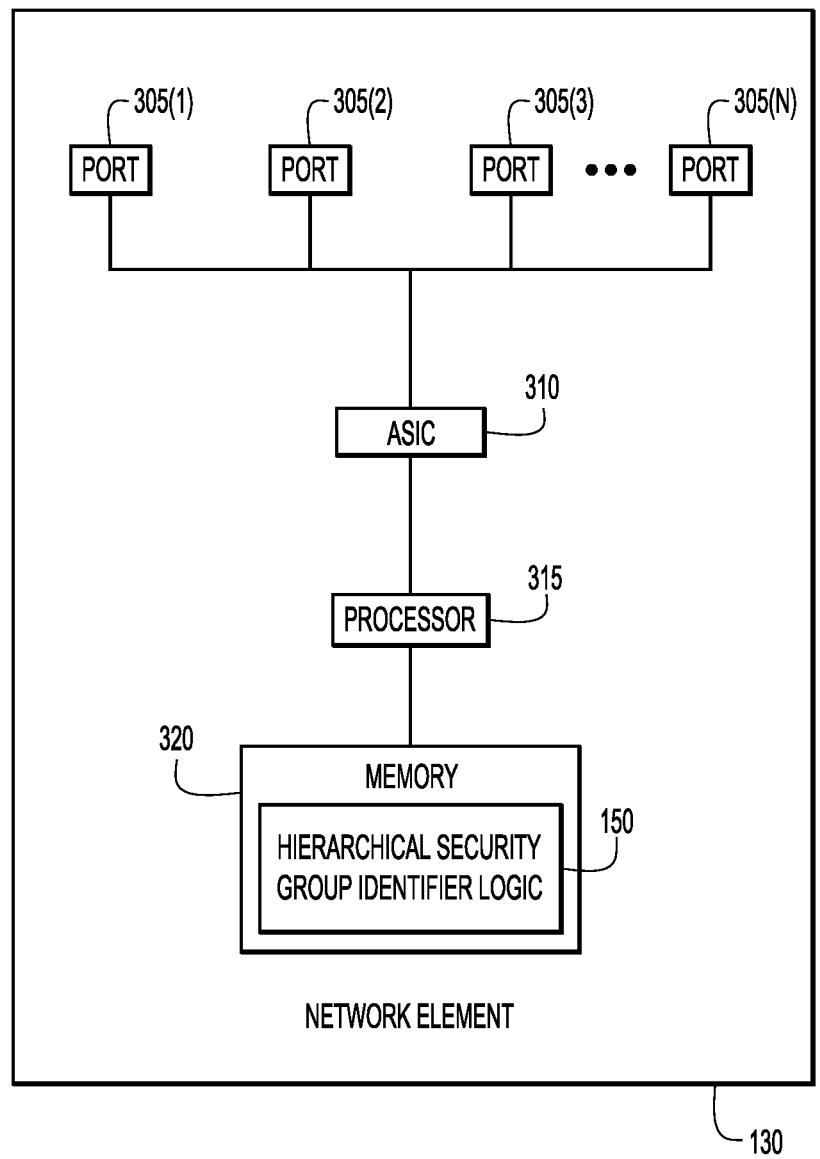
FIG. 3 is a block diagram of a network element configured to execute techniques relating to hierarchical security group identifiers, according to an example embodiment.

FIG. 3 is a block diagram of network element 130 (as shown in FIG. 1), which is configured to implement the techniques presented herein. The network element 130 includes a network interface in the form of a plurality of network ports 305(1)-305(N) that enable communications over a network, an Application Specific Integrated Circuit (ASIC) 310 that performs network processing functions, one or more processors 315 (e.g., microprocessors or microcontrollers), and memory 320. The memory 320 includes hierarchical security group identifier logic 150.

The memory 320 may include read only memory (ROM), random access memory (RAM), magnetic disk storage media devices, optical storage media devices, flash memory devices, electrical, optical, or other physical/tangible memory storage devices. Thus, in general, the memory 320 may comprise one or more tangible (non-transitory) computer readable storage media (e.g., a memory device) encoded with software comprising computer executable instructions and when the software is executed (e.g., by the one or more processors 315) it is operable to perform the operations described herein. In particular, as noted, the memory 320 includes hierarchical security group identifier logic 150 that, when executed, enables the network element 130 to perform the operations described herein.

Figure 4:
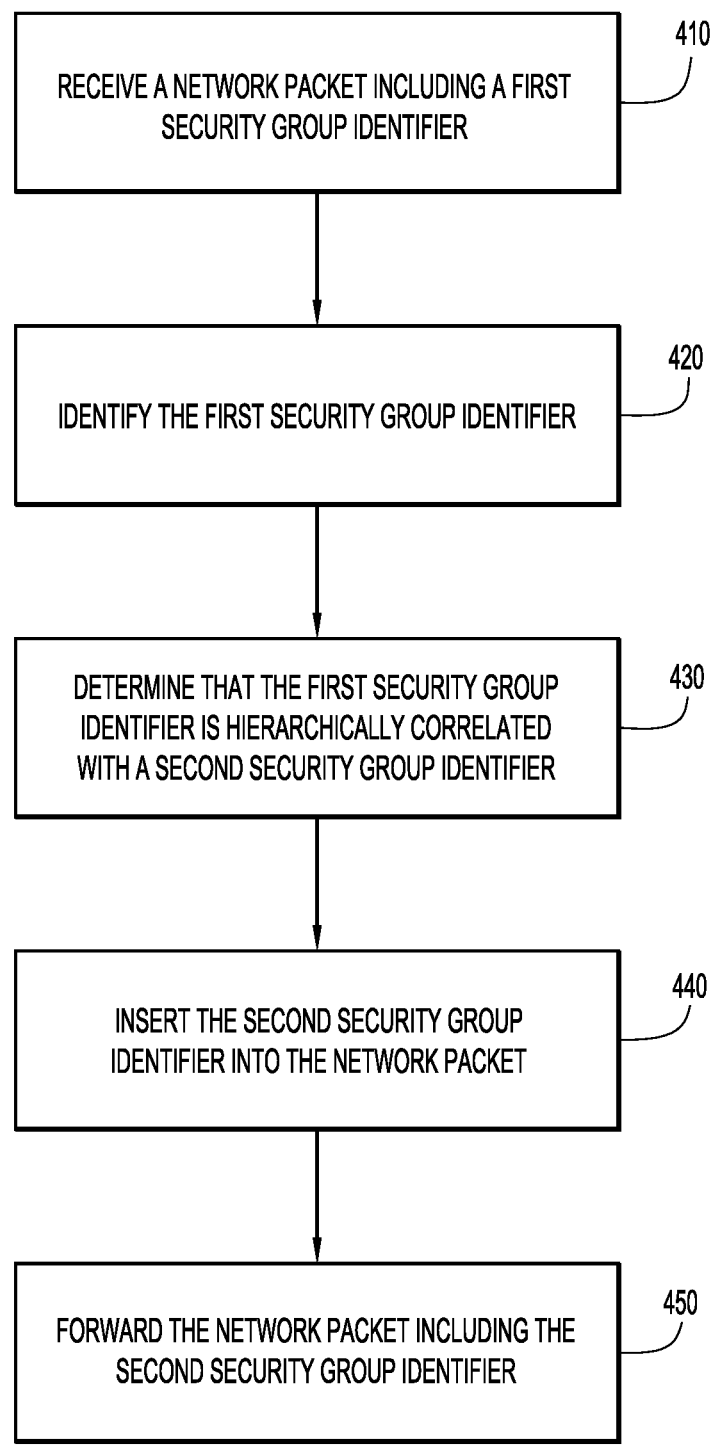
FIG. 4 is a flowchart of a generalized method in accordance with an example embodiment.

FIG. 4 is a flowchart of a generalized method in accordance with examples presented herein. The method is performed at a network element in a network arbitrarily referred to as a "first" network. At 410, the network element receives a network packet including a first security group identifier. At 420, the network element identifies the first security group identifier. At 430, the network element determines that the first security group identifier is hierarchically correlated with a second security group identifier. At 440, the network element inserts the second security group identifier into the network packet. At 450, the network element forwards the network packet including the second security group identifier.

The techniques described herein may also be useful in contexts other than those described above. For example, these techniques may be beneficial for cases that call for isolating devices within a fabric, but treating communications from those isolated devices differently upon exiting the fabric. For example, if an SDA fabric includes several Internet of Things (IoT) devices (e.g., Internet Protocol (IP) cameras, motion sensors, etc.), it may be desired to prevent IoT devices from communicating with each other within the fabric, but to have exactly the same policies when sending communications outside the fabric. These techniques may apply to this and other situations that are not explicitly described herein.

These techniques may also apply to Application Centric Infrastructure (ACI) environments. ACI is often implemented in data centers, and may employ Group-Based Policy (GBP). Whereas SDA may use SGTs to enforce security policies, ACI may use Endpoint Groups (EPGs). In other words, these techniques may apply to any suitable security group identifier, including SGTs or EPGs.

The hierarchical arrangements described herein improve scalability compared to flat arrangements, because flat arrangements may require more security group identifiers to be defined. Such hierarchical arrangements also provide improved functionality/user experience over flat arrangements, which can lose contextual association between identifiers.

In one form, a method is provided. The method comprises: at a network element in a first network: receiving a network packet including a first security group identifier; identifying the first security group identifier; determining that the first security group identifier is hierarchically correlated with a second security group identifier; inserting the second security group identifier into the network packet; and forwarding the network packet including the second security group identifier.

In another form, an apparatus in a first network is provided. The apparatus comprises: a network interface; memory; and one or more processors coupled to the network interface and the memory, wherein the one or more processors are configured to: receive, via the network interface, a network packet including a first security group identifier; identify the first security group identifier; determine that the first security group identifier is hierarchically correlated with a second security group identifier; insert the second security group identifier into the network packet; and forward, via the network interface, the network packet including the second security group identifier.

In another form, one or more non-transitory computer readable storage media are provided. The non-transitory computer readable storage media are encoded with instructions that, when executed by a processor of a network element in a first network, cause the processor to: receive a network packet including a first security group identifier; identify the first security group identifier; determine that the first security group identifier is hierarchically correlated with a second security group identifier; insert the second security group identifier into the network packet; and forward the network packet including the second security group identifier.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
at a network element:
obtaining, from a first network, a network packet destined for a second network, the network packet including a first security group identifier associated with a first set of security policies that applies to the network packet within the first network;
identifying the first security group identifier;
determining that the first security group identifier is hierarchically correlated with a second security group identifier associated with a second set of security policies that applies to the network packet within the second network such that the first set of security policies is inherited from the second set of security policies or the second set of security policies is inherited from the first set of security policies;
inserting the second security group identifier into the network packet; and
providing, to the second network, the network packet including the second security group identifier.

2. The method of claim 1, wherein the first security group identifier is a child security group identifier and the second security group identifier is a parent security group identifier of the child security group identifier.

3. The method of claim 1, wherein the second security group identifier is a child security group identifier and the first security group identifier is a parent security group identifier of the child security group identifier.

4. The method of claim 3, wherein determining that the parent security group identifier is hierarchically correlated with the child security group identifier includes examining destination information of the network packet.

5. The method of claim 1, wherein the first set of security policies is inherited from the second set of security policies and is a subset of the second set of security policies.

6. The method of claim 1, wherein the second set of security policies is inherited from the first set of security policies and is a subset of the first set of security policies.

7. The method of claim 1, wherein the first security group identifier is further associated with a first set of classification criteria that applies to the network packet within the first network, the second security group identifier is further associated with a second set of classification criteria that applies to the network packet within the second network, the first set of classification criteria is inherited from the second security group identifier, and the first set of classification criteria is a subset of the second set of classification criteria.

8. The method of claim 1, wherein the first security group identifier is further associated with a first set of classification criteria that applies to the network packet within the first network, the second security group identifier is further associated with a second set of classification criteria that applies to the network packet within the second network, the second set of classification criteria is inherited from the first set of classification criteria, and the second set of classification criteria is a subset of the first set of classification criteria.

9. The method of claim 1, wherein the first network is a software defined access network, the first security group identifier is a first security group tag, and the second security group identifier is a second security group tag.

10. The method of claim 1, wherein the first network is an application centric infrastructure network, the first security group identifier is a first endpoint group, and the second security group identifier is a second endpoint group.

11. An apparatus comprising:
a network interface;
memory; and
one or more processors coupled to the network interface and the memory, wherein the one or more processors are configured to:
  obtain, from a first network, a network packet destined for a second network, the network packet including a first security group identifier associated with a first set of security policies that applies to the network packet within the first network;
  identify the first security group identifier;
  determine that the first security group identifier is hierarchically correlated with a second security group identifier associated with a second set of security policies that applies to the network packet within the second network such that the first set of security policies is inherited from the second set of security policies or the second set of security policies is inherited from the first set of security policies;
  insert the second security group identifier into the network packet; and
  provide, to the second network, the network packet including the second security group identifier.

12. The apparatus of claim 11, wherein the first security group identifier is a child security group identifier and the second security group identifier is a parent security group identifier of the child security group identifier.

13. The apparatus of claim 11, wherein the second security group identifier is a child security group identifier and the first security group identifier is a parent security group identifier of the child security group identifier.

14. The apparatus of claim 11, wherein the first set of security policies is inherited from the second set of security policies and is a subset of the second set of security policies.

15. The apparatus of claim 11, wherein the second set of security policies is inherited from the first set of security policies and is a subset of the first set of security policies.

16. One or more non-transitory computer readable storage media encoded with instructions that, when executed by a processor of a network element, cause the processor to:
  obtain, from a first network, a network packet destined for a second network, the network packet including a first security group identifier associated with a first set of security policies that applies to the network packet within the first network;
  identify the first security group identifier;
  determine that the first security group identifier is hierarchically correlated with a second security group identifier associated with a second set of security policies that applies to the network packet within the second network such that the first set of security policies is inherited from the second set of security policies or the second set of security policies is inherited from the first set of security policies;
  insert the second security group identifier into the network packet; and
  provide, to the second network, the network packet including the second security group identifier.

17. The one or more non-transitory computer readable storage media of claim 16, wherein the first security group identifier is a child security group identifier and the second security group identifier is a parent security group identifier of the child security group identifier.

18. The one or more non-transitory computer readable storage media of claim 16, wherein the second security group identifier is a child security group identifier and the first security group identifier is a parent security group identifier of the child security group identifier.

19. The one or more non-transitory computer readable storage media of claim 16, wherein the first set of security policies is inherited from the second set of security policies and is a subset of the second set of security policies.

20. The one or more non-transitory computer readable storage media of claim 16, wherein the second set of security policies is inherited from the first set of security policies and is a subset of the first set of security policies.

* * * * *